Figure 1:
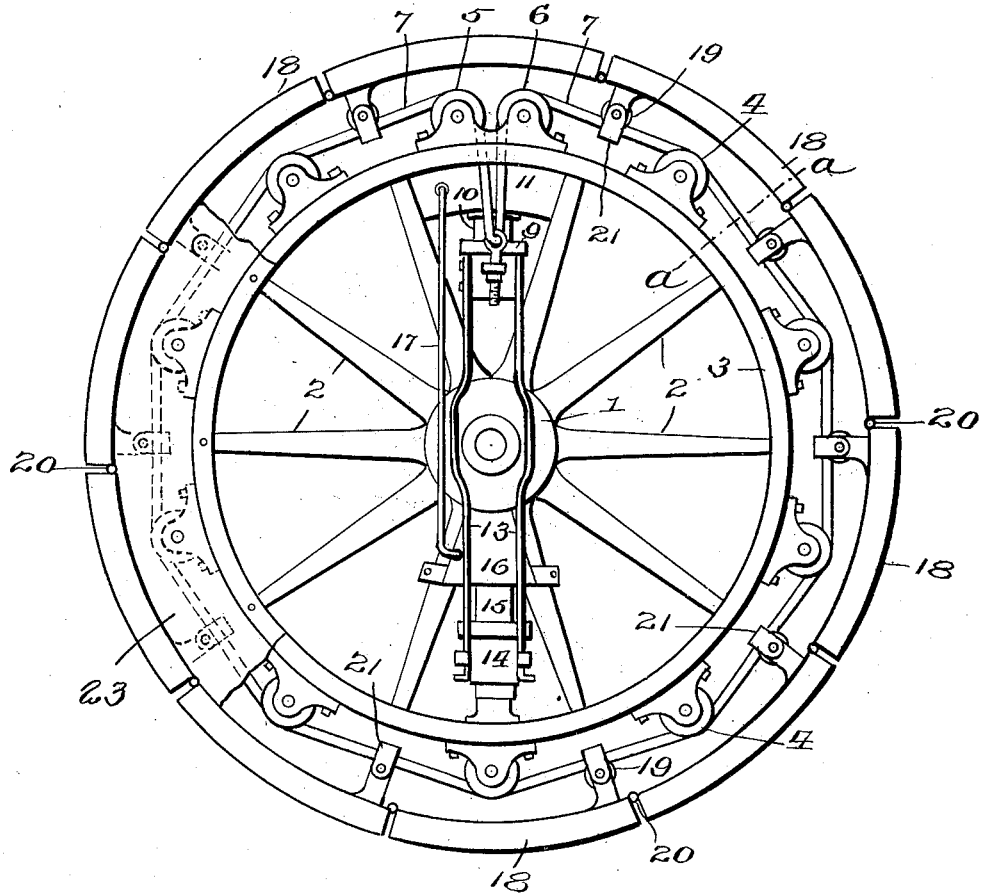

J. PIERCE.
WHEEL.
APPLICATION FILED OCT. 25, 1912.

1,091,241.

Patented Mar. 24, 1914.
2 SHEETS—SHEET 1.

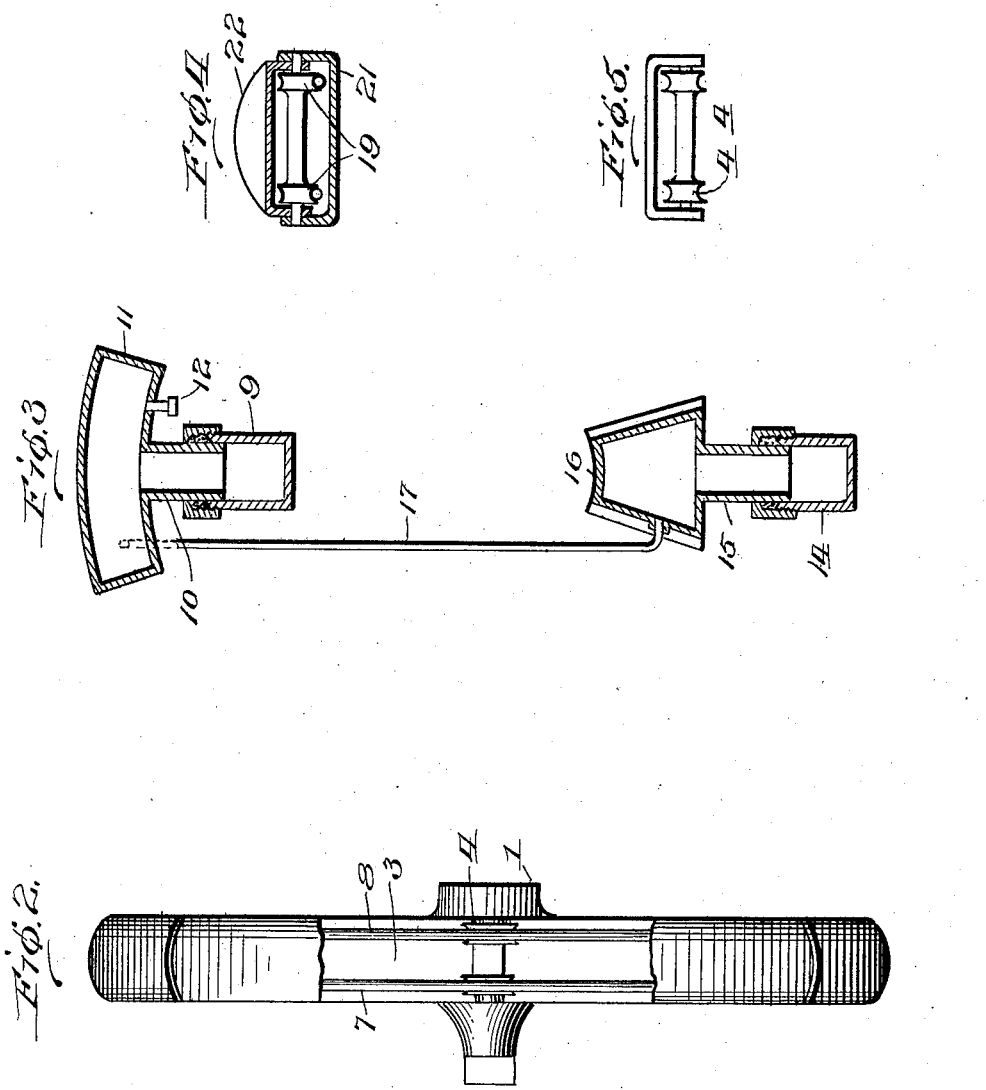

UNITED STATES PATENT OFFICE.

JAMES PIERCE, OF OGDEN, UTAH.

WHEEL.

1,091,241.  Specification of Letters Patent.  Patented Mar. 24, 1914.

Application filed October 25, 1912. Serial No. 727,741.

*To all whom it may concern:*

Be it known that I, JAMES PIERCE, a citizen of the United States, residing at Ogden, in the county of Weber and State of Utah, have invented certain new and useful Improvements in Wheels, of which the following is a specification.

This invention relates to wheels and more particularly to that class known as resilient treads.

The object of my invention is to construct a wheel having a resilient tread in a unique, compact and substantial manner.

Another object of my invention is to construct a wheel in such a manner, as to avoid the use of pneumatic tubes and casings, and yet produce a tread which will yield to an uneven surface so perfectly as to produce a pneumatic result.

A further object of my invention is to construct a wheel having a sectional tread supported by cables, said cables being held tight by a pneumatic device, thus affording a resilient support for the tread or sections thereof.

With these objects in view and such others as may hereinafter appear, my invention consists in the particular construction of the various parts, and in the novel manner of combination and arrangement of said parts, all of which will be more fully described and specifically pointed out in the appended claims.

In the drawings forming a part of this specification:—Figure 1, is a view in side elevation, with the casing partly removed. Fig. 2, is an edge view of the wheel partly broken away to show the cables and pulleys used therein. Fig. 3, is a central sectional view of the air cushion device. Fig. 4, is a detailed sectional view on the line *a—a*, Fig. 1, showing the tread and pulley, and Fig. 5, is a detail edge view of the pulleys employed in carrying the cables.

Referring by numerals to the drawings, 1 represents the hub of a wheel, which may be of any desired construction, having a series of spokes 2, supporting a felly 3, upon which is mounted a series of longitudinal pulleys 4, spaced apart as clearly shown in Fig. 1. Two of the longitudinal pulleys 5 and 6 are in juxtaposition to each other, the object of which will be hereinafter explained. Mounted upon the pulleys 4, are two cables 7 and 8, the respective ends of which pass over the pulleys 5 and 6, and down to a piston 9, to which they are connected in any desirable manner to avoid the binding of the piston upon the cylinder 10, which is mounted between the spokes 2, and is provided with an air chamber 11, having an air valve 12, for the purpose of receiving the pressure by which the cables are held tight. The piston 9, is connected by adjustable rods 13, to an oppositely disposed piston 14, mounted upon an auxiliary cylinder 15, which is also provided with an air chamber 16, the chambers 11 and 16, being connected by a pipe 17, in order to charge and maintain an equal pressure of air in both cylinders. The auxiliary cylinder 15, is normally idle, and is brought in play only upon the wheel receiving an unusual shock, or when the shock is received at any one of the points of connection of the sectional rim or tread hereinafter referred to.

The tread is formed in sections 18, as most clearly shown in Fig. 1, and these sections are each provided with longitudinal pulleys 19, arranged approximately near one end, and are hinged together as shown at 20, in such a manner that they will admit of rocking and will be interchangeable. The pulleys 19, upon the sectional tread, rest upon the cables 7 and 8, and are prevented from being displaced by U-shaped members 21, passing beneath the cables. The sectional treads are provided with rubber facings 22, and are connected by a strip of canvas 23, or other suitable material to the felly, thus completely housing the cables and pulleys.

I deem the foregoing explanation sufficiently plain to be readily understood by all conversant in such matters, the extreme simplicity rendering an elaborate description unnecessary.

Having thus described my invention, what I claim as new and desire to secure by Letters Patent is:—

1. A wheel having a series of longitudinal pulleys mounted upon its rim, cables resting upon said pulleys, the free ends of the cables being connected to the piston of an air compressing device, a tire composed of sections, a pulley upon the end of each section, the pulleys upon the tire sections engaging the cables, substantially as specified.

2. A wheel having a series of longitudinal pulleys upon its rim, cables resting upon said pulleys, an air compressor, the piston of the air compressor being connected to the free ends of the cables, an auxiliary air compressor adjustably connected to the piston of the main air compressor, a sectional tread mounted upon the cables, substantially as specified.

3. A wheel having a series of longitudinal pulleys mounted upon its rim corresponding cables resting upon said pulleys, an air compressor interposed between the spokes of the wheel, an auxiliary air compressor interposed between the spokes in an opposite position, the chambers of the two air compressors being connected, adjustable means for connecting the pistons of the air compressors, the free ends of the cables being connected to the piston of the main air compressor, a sectional tread, pulleys upon one end of each of the sections composing the tread, the pulleys upon the sections resting upon the cables, means for securing the sections upon the cable, and a housing for inclosing the pulleys and cables, substantially as specified.

JAMES PIERCE.

Witnesses:
WM. H. HOLLOWAY,
O. H. FOWLER.

---

Copies of this patent may be obtained for five cents each, by addressing the "Commissioner of Patents, Washington, D. C."